(12) United States Patent
Glassford

(10) Patent No.: US 7,537,200 B2
(45) Date of Patent: May 26, 2009

(54) CONTROLLED ATMOSPHERE GAS INFUSION

(76) Inventor: Craig L. Glassford, 121 Phillips Drive, New Maryland, New Brunswick (CA) E3C 1E6

( * ) Notice: Subject to any disclaimer, the term of this patent is extended or adjusted under 35 U.S.C. 154(b) by 219 days.

(21) Appl. No.: 10/533,085

(22) PCT Filed: Oct. 30, 2003

(86) PCT No.: PCT/CA03/01651

§ 371 (c)(1),
(2), (4) Date: Nov. 15, 2005

(87) PCT Pub. No.: WO2004/039482

PCT Pub. Date: May 13, 2004

(65) Prior Publication Data

US 2006/0163753 A1 Jul. 27, 2006

Related U.S. Application Data

(60) Provisional application No. 60/422,490, filed on Oct. 31, 2002.

(51) Int. Cl.
*B01F 3/04* (2006.01)
(52) U.S. Cl. .................. 261/102; 261/104; 261/105
(58) Field of Classification Search .............. 261/102, 261/104, 105, 107
See application file for complete search history.

(56) References Cited

U.S. PATENT DOCUMENTS

| | | | | |
|---|---|---|---|---|
| 4,268,279 A | * | 5/1981 | Shindo et al. | 95/46 |
| 6,156,096 A | * | 12/2000 | Sirkar | 95/44 |
| 6,858,145 B2 | * | 2/2005 | Dey et al. | 210/640 |
| 2003/0201223 A1 | * | 10/2003 | Cheng et al. | 210/500.23 |
| 2004/0089600 A1 | * | 5/2004 | Haq et al. | 210/337 |
| 2005/0230856 A1 | * | 10/2005 | Parekh et al. | 261/122.1 |

* cited by examiner

Primary Examiner—Scott Bushey

(57) ABSTRACT

The invention disclosed relates to a method and apparatus for controlling the dissolved gas content of aqueous liquid containing a dissolved gas by providing a microporous hydrophobic hollow fibre membrane, to provide at equilibrium a stable interface between an aqueous liquid phase containing dissolved gas on one side of the membrane and a gaseous phase on the other side of the membrane, and controlling the aqueous phase and gaseous phase pressures, such that in operation the gaseous phase pressure is up to but not exceeding the aqueous phase pressure, and flowing the gaseous and liquid phases across the membrane, to provide simultaneous mass transfer through the membrane of a first gas in the gaseous phase into the liquid phase and of a second gas dissolved in the aqueous liquid into the gaseous phase, whereby the gas content of the first gas in the aqueous phase is increased, the gas content of the second gas in the gaseous phase is decreased and the total dissolved gas pressure (TG) of the aqueous phase is altered.

2 Claims, 12 Drawing Sheets

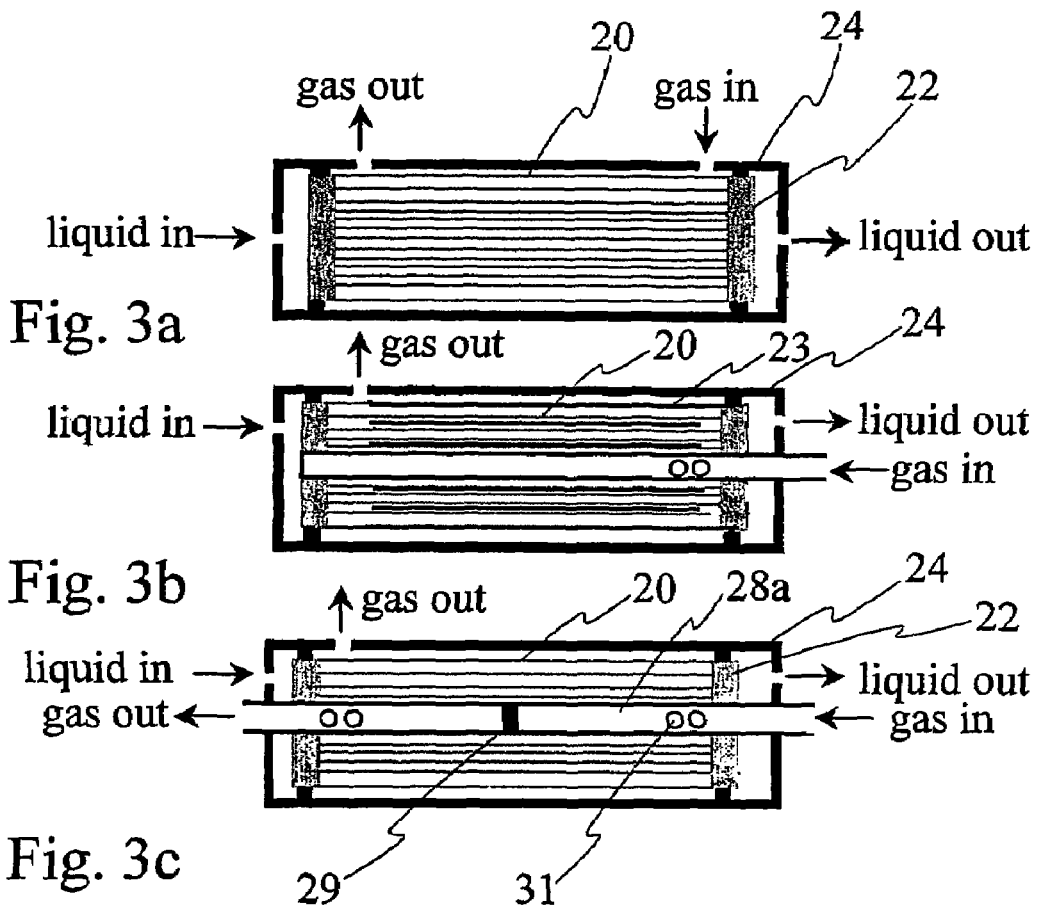
Fig. 3a
Fig. 3b
Fig. 3c
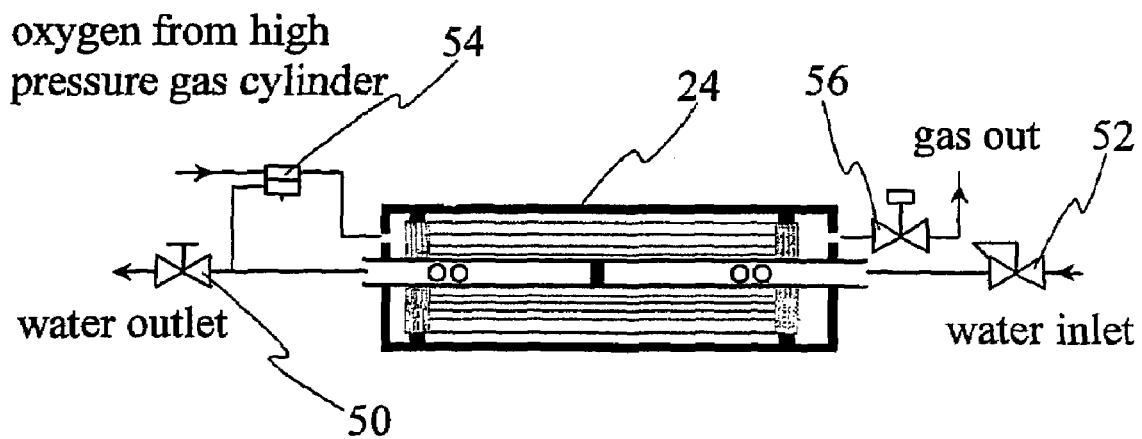
Fig. 15

CONTROLLED ATMOSPHERE GAS INFUSION

This application is a National Stage application of PCT Application PCT/CA2003/001651 filed 30 Oct. 2003 which claims benefit of U.S. Provisional Application 60/422,490 filed Oct. 31, 2002.

BACKGROUND OF THE INVENTION

At equilibrium with one atmosphere of air pressure, water will contain dissolved gases whose partial pressures will, quite naturally, sum to one atmosphere. Theoretically, neglecting gases such as argon and (for the moment) carbon dioxide, that one atmosphere of dissolved gas pressure will essentially consist of 0.21 atmospheres of oxygen pressure and 0.79 atmospheres of nitrogen pressure. When it comes to the concentration of each of these molecules in the water, however, the apparent 4:1 ratio of nitrogen to oxygen does not hold true. In actual fact, at 20° C., the water, at equilibrium, will contain about 15.3 ppm of nitrogen and 9.3 ppm of oxygen-less than a 2:1 ratio! This difference is due to Henry's Law and the ability of water to dissolve gases. The Henry's Law constant for nitrogen at 20° C. is approximately 79,000 (atm. per mol fraction) while that oxygen is approximately 44,000. Put another way, each ppm of dissolved nitrogen exerts a higher pressure than a dissolved ppm of oxygen. This difference, in areas such as aquaculture, can be exploited with the correct technology. Gas Infusion is such a technology.

It is known that the level of dissolved oxygen(DO) in the water can influence the health and growth rate of fish. Generally speaking, the higher the DO level in the water, the better is for the fish. (This is a general statement only. Obviously, there are/will be limitations.) One of the problems faced by the industry is finding an economical method of introducing higher levels of oxygen into the water. It is also known that the overall dissolved gas pressure can play a significant role in fish health and growth rate, etc. Just like humans who can undergo the 'bends' as a result of exposure to high (principally inert) gas pressures, fish can also be adversely affected if the total dissolved gas pressure is too high. Conventionally, the limitation here is that an increase in dissolved oxygen content would result in an increase in total dissolved gas pressure. Another factor that can affect health and growth rate, is the presence or build up in the water of noxious gases. Principle among these is carbon dioxide. Although present in the water in very low quantities as a result of atmospheric equilibrium, it can build up as a result of respiration. The major problem is that the pH of the water falls dramatically with even small increases in $CO_2$ concentration.

Conventional gas/liquid mass transfer equipment or technology in the aquaculture industry seems focused only on achieving a minimum dissolved oxygen concentration in the water and not on what is really needed, reaching and maintaining an optimum water 'atmosphere'.

In our prior U.S. patent application Ser. No. 09/307,423, filed 10 May 1999 (now U.S. Pat. No. 6,209,855, issued Apr. 3, 2001), the invention described involves the concept of gas infusion. The hydrophobic nature of a hydrophobic microporous hollow fibre membrane establishes a stable interface between an aqueous phase on one side of the fibre and a gas phase on the other. This interface remains stable so long as there does not exist a pressure differential between the phases in excess of the 'breakthrough' pressure required to 'push' the aqueous phase through the micropores, or the gas pressure exceeds the liquid pressure to such an extent as to bubble into the liquid phase. This stable interface can be used to transfer mass from one phase to the other. The disclosure of this patent is incorporated herein by reference.

SUMMARY OF THE INVENTION

According to the invention, we have now found that, designed, built and operated correctly, gas infusion can be used to increase dissolved gas content(DG) of a first gas e.g oxygen of an aqueous liquid to previously unimagined levels, while simultaneously lowering the dissolved gas content of other dissolved gases such as nitrogen, ammonia, carbon dioxide and mixtures thereof and altering e.g by lowering total dissolved gas pressure(TG) of the aqueous liquid, and do it all economically. We call this new concept, "controlled atmosphere gas infusion".

What is not covered in our prior patent, or in the literature, is the concept and utility of using that stable interface described above for two-way gas transport. That is, the mass transfer of a first gas (e.g. $O_2$) from the gaseous phase to the liquid phase and the simultaneous mass transfer of noxious gas (e.g. $N_2$) from the liquid phase to the gaseous phase.

The transfer of mass from a gaseous phase to a liquid phase is known as absorption. We have found that if the concentration of the 'solute' (the gas to be transferred) gas in the gaseous phase is not pure at all points within the transfer 'device', the most efficient 'device' should be countercurrent in nature. Transfer of a dissolved gas mass from a liquid phase to a gaseous phase is known as stripping.

The absorption and stripping processes are represented schematically in FIGS. 1 and 2.

According to one aspect of the invention, a method is provided for controlling the dissolved gas content of an aqueous liquid containing a dissolved gas, comprising (a) providing a microporous hydrophobic hollow fibre membrane, to provide at equilibrium a stable interface between an aqueous liquid phase containing dissolved gas on one side of the membrane and a gaseous phase on the other side of the membrane, (b) controlling the aqueous and gaseous phase pressure, such that the gaseous phase pressure is up to but not exceeding the aqueous phase pressure, (c) flowing the gaseous and liquid phases across the membrane, preferably in a substantially countercurrent manner, to provide simultaneous mass transfer through the membrane of a first gas in the gaseous phase into the liquid phase, and of a second gas dissolved in the aqueous liquid into the gaseous phase, whereby the gas content of the first gas in the aqueous phase is increased, the gas content of the second gas in the gaseous phase is decreased and the total dissolved gas pressure(TG) of the aqueous phase is altered e.g. lowered.

According to another aspect of the invention, an apparatus is provided for controlling the dissolved gas content of an aqueous liquid containing dissolved gas, comprising a microporous hydrophobic hollow fibre membrane, to provide at equilibrium a stable interface between an aqueous liquid phase containing dissolved gas on a first side of the membrane and a gaseous phase on an opposite side of the membrane, means providing preferably substantially countercurrent aqueous liquid phase and gaseous phase flow paths on opposite sides of the membrane, means for supplying an aqueous liquid phase containing dissolved gas to the first side of the membrane, means for controlling the flow feed rate of the aqueous liquid phase, means for controlling the aqueous liquid phase inlet pressure, means for supplying a gaseous phase to the other side of the membrane, means for controlling the gaseous phase inlet pressure, means for removing gaseous phase from the apparatus, and means for removing aqueous phase from the apparatus, wherein the aqueous phase and the gaseous phase pressures are controlled such that the gaseous phase pressure is up to but not exceeding the aqueous phase pressure, such that in operation the simultaneous mass transfer through the membrane of a first gas in the gaseous phase into the liquid phase and of a second gas dissolved in the aqueous liquid into the gaseous phase occurs, whereby the gas content of the first gas in the aqueous phase is increased, the gas content of the second gas in the gaseous phase is decreased and the total dissolved gas pressure(TG) of the aqueous phase is altered e.g. lowered.

According to yet another aspect of the invention, the mass transfer of the first gas from the gaseous phase into the liquid phase occurs by absorption, and the mass transfer of the second gas from the liquid phase into the gaseous phase occurs by stripping.

According to a further aspect of the invention, wherein the process operates under the control of the G/L ratio, wherein G is the flow rate of the first gas in g/time unit, and L is the flow rate of the aqueous phase in 1/time unit. An increase in the G/L ratio occurs e.g. by increasing the amount of the first gas(G) e.g. oxygen in the aqueous phase, while keeping other operational parameters L and including temperature constant. Also, it will be appreciated that L can be varied, while keeping G and the other operating parameters constant, or both G and L can be varied, depending upon the desired result.

According to yet another aspect of the invention, the aqueous liquid is water, the first gas is oxygen and the second gas is another dissolved gas such as nitrogen, ammonia, carbon dioxide or a mixture thereof.

BRIEF DESCRIPTION OF THE DRAWING

FIG. 3 includes schematic illustrations of three devices for countercurrent gaseous/aqueous phase flow according to the invention.

FIG. 15 is a schematic illustration of a FIG. 9 module, including the various aqueous and gaseous phase pressure and flow rate control means.

DETAILED DESCRIPTION OF THE INVENTION

EXAMPLE 1

Figure 1:
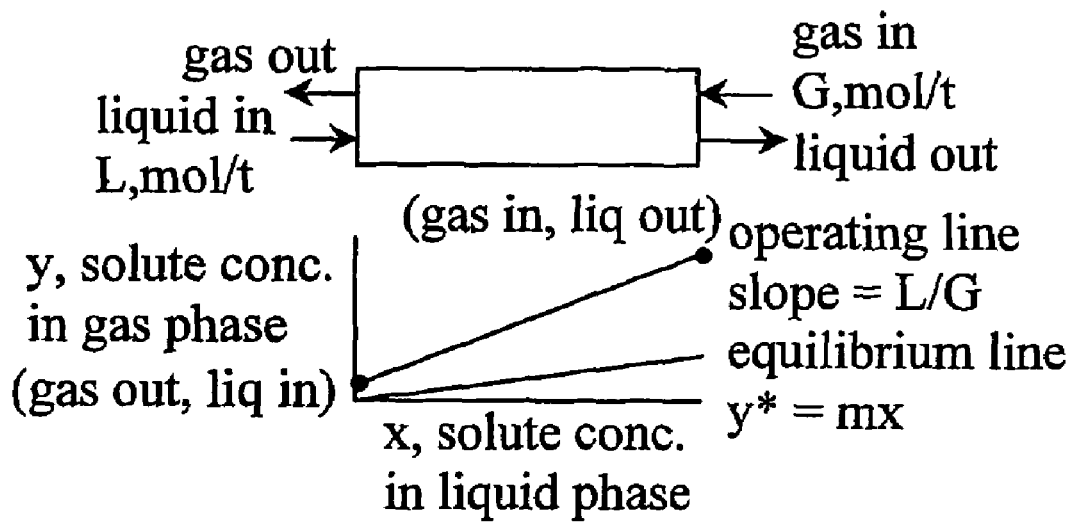
FIG. 1 is a schematic illustration of the absorption process according to the invention.
Figure 2:
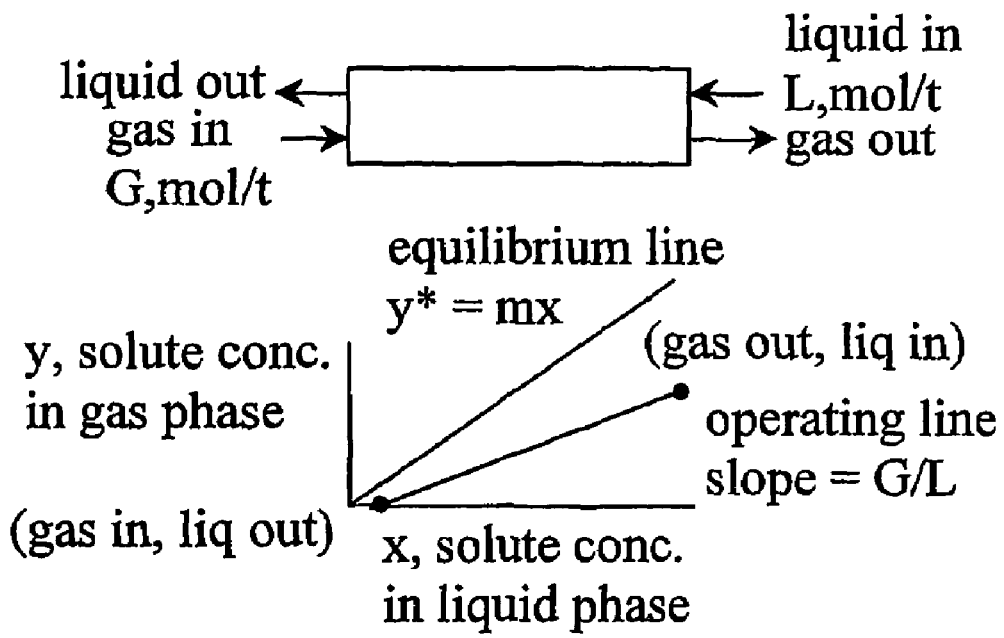
FIG. 2 is a schematic illustration of the stripping process according to the invention.

If, for example, the object of a process was to increase the dissolved oxygen content of water (aquaculture and hydroponics are just two applications) by using pure oxygen then it would preferable for that process to utilize as much of the oxygen as possible. with little wastage. Conversely, if it was desired to remove gases such as nitrogen and carbon dioxide from water, using oxygen, then it is obvious (from FIG. 1, the stripping diagram, that the larger the G/L ratio, the greater the distance between the equilibrium line and the operating line, ie. the greater the driving force for the gas transfer) that more oxygen would be better. Therefore, it is also obvious that for both of these operations to be carried out efficiently/economically, the 'device' must be designed and constructed properly. Three schematic illustrations of such devices are shown in FIG. 3.

FIG. 3 shows three different embodiments of countercurrent gas/liquid flow devices according to the invention, adapted for countercurrent flow of the liquid phase(containing noxious gases to be stripped) down the bore of the fibres 20 (ie on the lumen side) and the gas on the outside(the shell side) of the fibres. If the device is substantially countercurrent, it is apparent that alternatively, the gas could flow down the fibre bore and the liquid outside. The fibres 20 are potted in epoxy tubesheets 22, and located in a pressure casing 24.

The first of the devices(A) would likely suffer from poor flow distribution outside the fibres (shell side) and is unlikely to exhibit the same degree of countercurrent flow as devices B and C The second device(B) (which has an internal hollow core 28a, through which the shell side fluid enters) employs internal wraps 23 (darker lines) of impermeable material, effectively dividing the device into distinct radial sections, to direct shell side flow countercurrent to the lumen/tube side flow.

The third device(C)(which has a solid core plug 29) uses two shell side outlets to distribute the shell side fluid. One of these outlets is on the radial exterior of the fibre bundle and the other 31, is on the radial interior of the fibre bundle and is done through the hollow core, on the opposite side of the solid core plug from the shell side fluid inlet. Internal wraps, such as those in device B, could conceivably be useful in this device.

Figure 4:
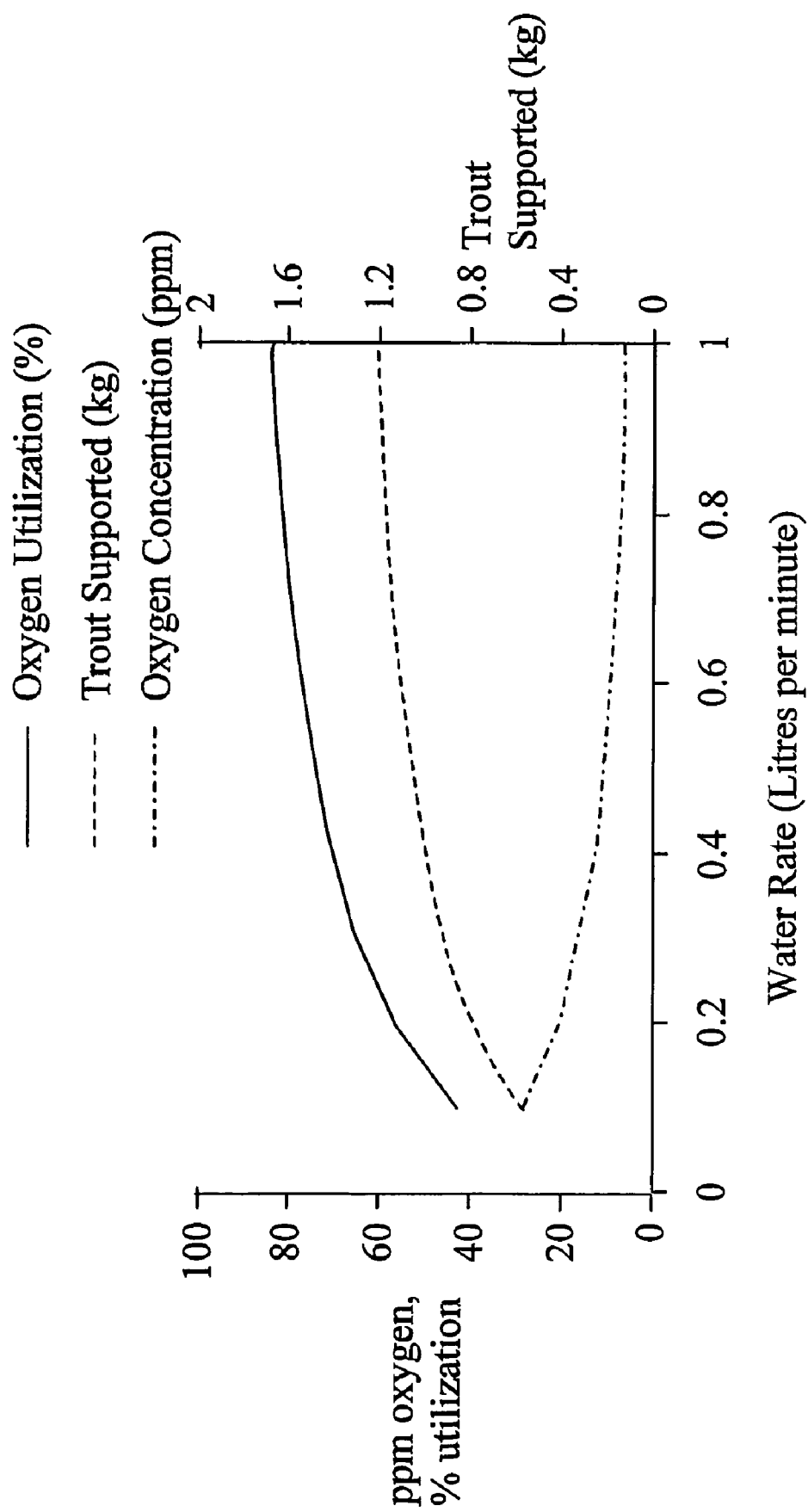
FIGS. 4 to 7 are graphs which illustrate the theoretical performance of the invention.
Figure 5:
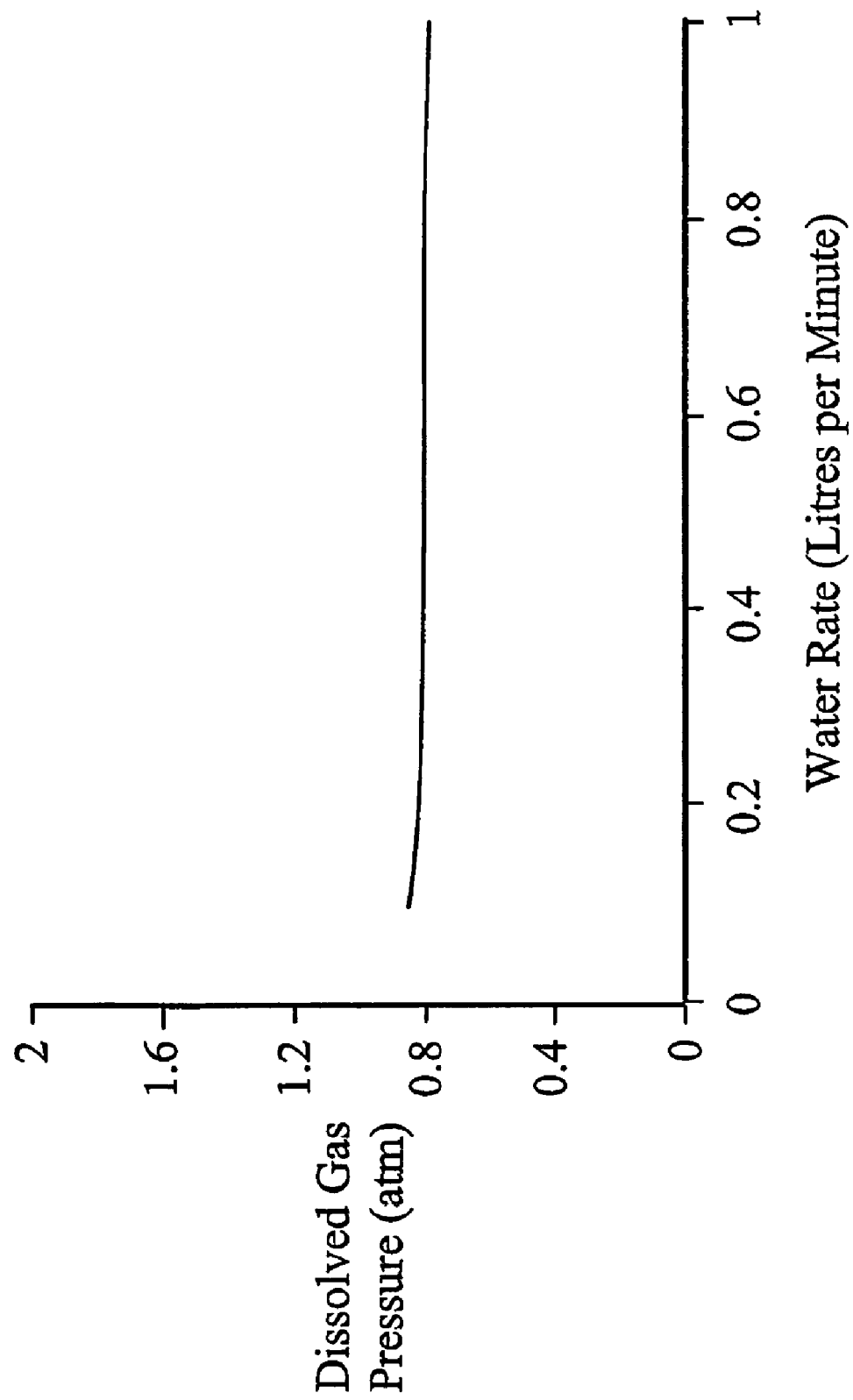
Figure 6:
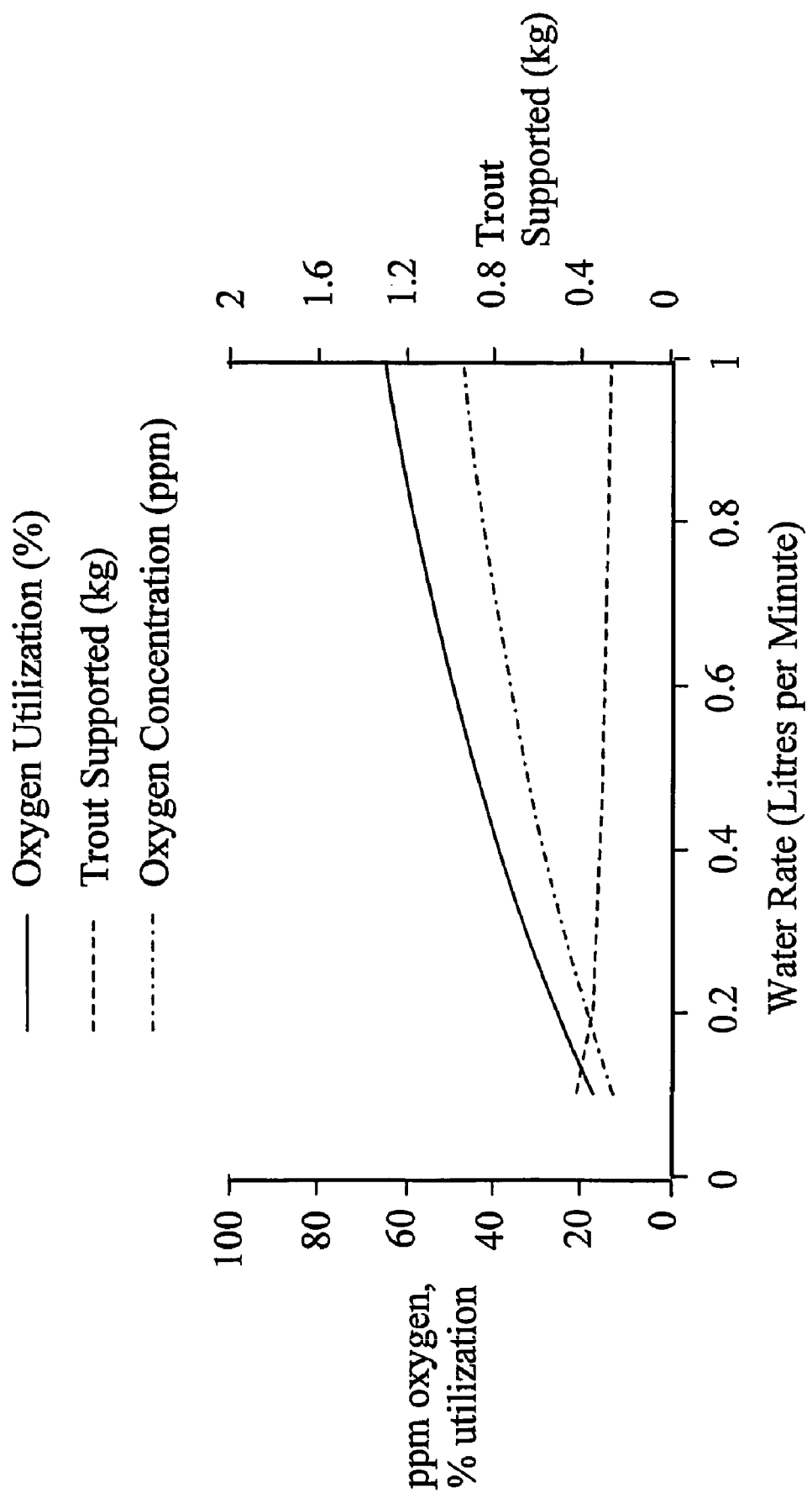
Figure 7:
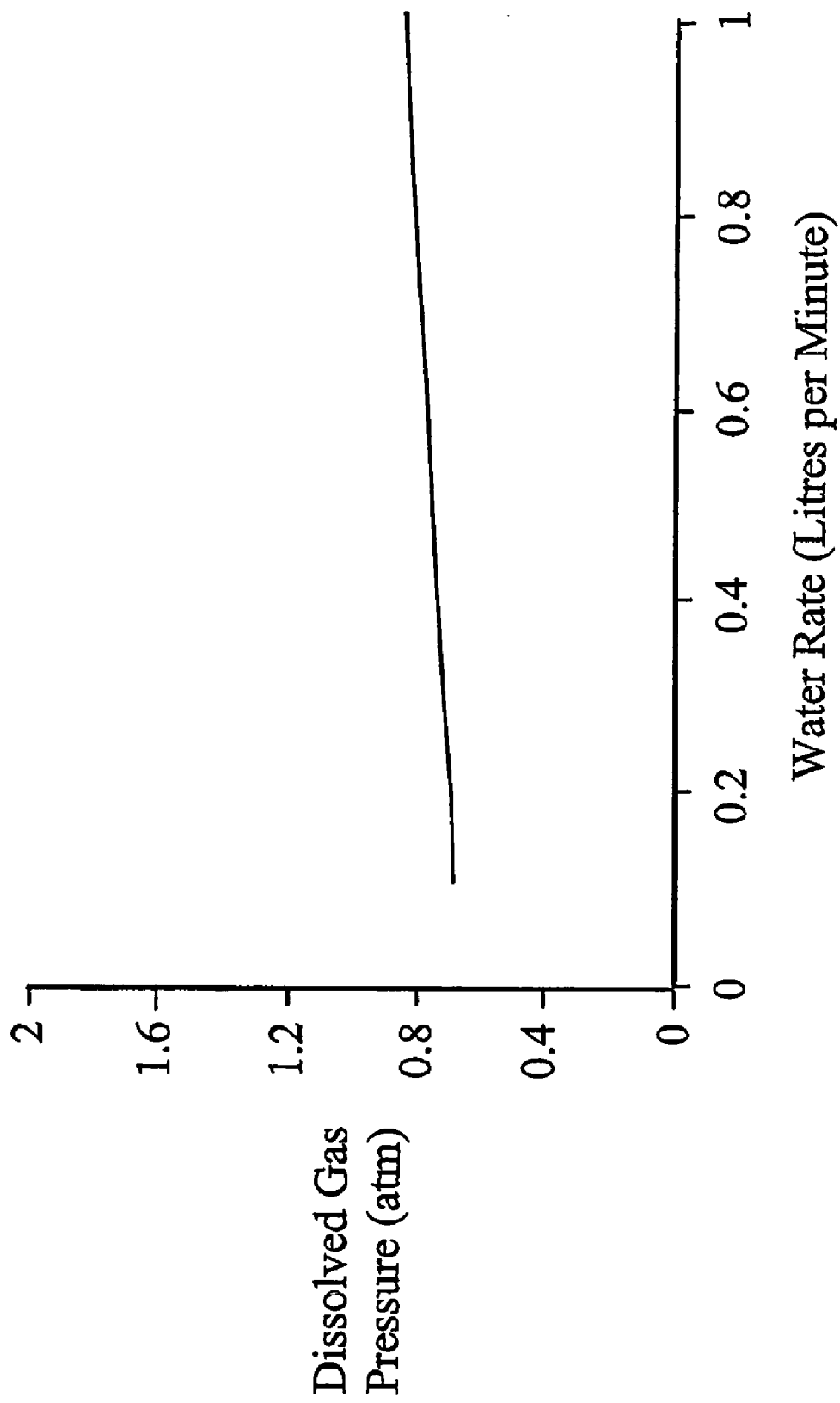

FIGS. 4 to 7 are graphs generated by computer modeling, based upon the same data/model as used in our prior U.S. application Ser. No. 09/307,423, showing how a properly designed/constructed/operated device (should) perform. FIGS. 4 and 5 are for an embodiment of the invention where the aqueous phase is on the inside(lumen side) of the hollow fibre membrane, and FIGS. 6 and 7 are for the embodiment of the invention where the gaseous phase is on the inside of the hollow fibre membrane.

FIGS. 4 and 5 illustrate performance of controlled atmosphere using a 1"×7" gas infusion module, with 25° C. groundwater feed(inside membrane) and 0.5 ppm dissolved oxygen, 5 scc per minute oxygen feed(outside membrane).

FIGS. 6 and 7 illustrate performance of controlled atmosphere using a 1"×7" gas infusion module, with 25° C. groundwater feed(outside membrane) and 0.5 ppm dissolved oxygen, 5 scc per minute oxygen feed(inside membrane).

Some may argue that this invention is simply an artificial lung and, as such, can be found in the literature. However, this would be wrong. An artificial lung is meant to provide the oxygen required by a biological organism(s) and remove the products of respiration. From the attached graphs it is obvious that Controlled Atmosphere(CA) Gas Infusion does far more than was ever, or could ever have been, anticipated by hollow fibre based artificial lungs. CA gas infusion creates an environment (or a water 'atmosphere') that can be optimized for different species of fish or plants, or other biological organism. It is emphasized that nitrogen is not normally considered a noxious gas, but its removal is primarily responsible for being able to lower the overall dissolved gas pressure. If the device removed $CO_2$ only, it might be thought of as an artificial lung, but since the nitrogen level is also altered (and in fact all dissolved gases present in the system), this process has been called "controlled atmosphere".

It will be appreciated that FIGS. 4 to 7 showing high dissolved oxygen (and high utilization) and low total dissolved gas pressures are just examples. By the same token CA gas infusion can allow $O_2$, $N_2$, $CO_2$, $NH_3$ and others to be manipulated for a given situation. In these figures, "scc" represents standard cubic centimeters, and "trout supported" is a term used in the aquaculture industry as a measure of how much oxygen the device puts into the water. For example, one kg of rainbow trout requires approximately 0.29 g of oxygen per hour to live.

It will also be appreciated by those skilled in the art that FIGS. 4 to 7 show the response of a device under the influence of a single variable, (in addition to changing which phase is present in the fibre lumen) in these cases, the liquid throughput(L). The graphs also show that other variables are kept constant and therefore constitute other controlled parameters. For example, the size(geometry) of the device and the number of fibers that it contains, the temperature, whether the liquid is flowed inside or outside of the fibers, the gas flow rate(G) etc . . .

EXAMPLE 2

The following is a description of the tests that were performed and the modules on which they were performed:

For comparison purposes, tests were run on a prior art membrane module used in our prior U.S. application Ser. No. 09/307,423 (see FIG. 8) which employs cross-current gas/liquid flow paths (FIG. 8), and a membrane module according to the invention illustrated in FIG. 9 adapted for countercurrent gas/liquid flow paths. Note that the FIG. 9 and FIG. 3C modules are identical except for the reversal of the liquid and gas flow paths and the exclusion of the exterior bundle shell side outlet.

Figure 8:
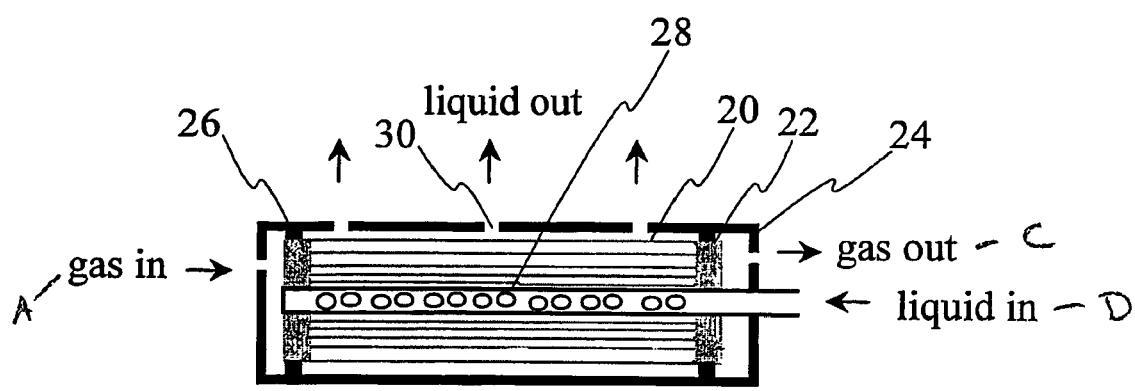
FIG. 8 is a schematic illustration of the operation of a prior art device, for comparison purposes.
Figure 9:
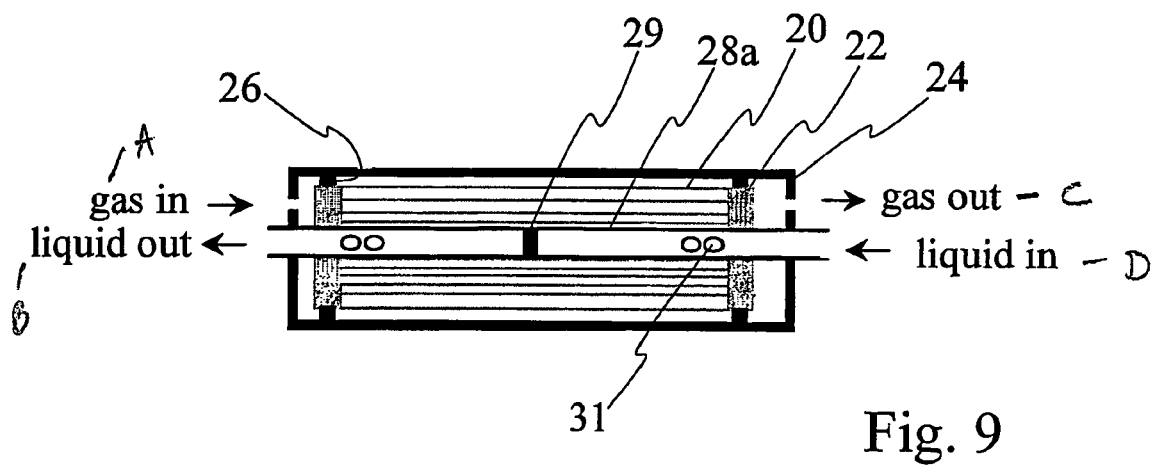
FIG. 9 is a schematic illustration of the FIG. 3C device, with reversed gas/liquid flow paths.
Figure 10:
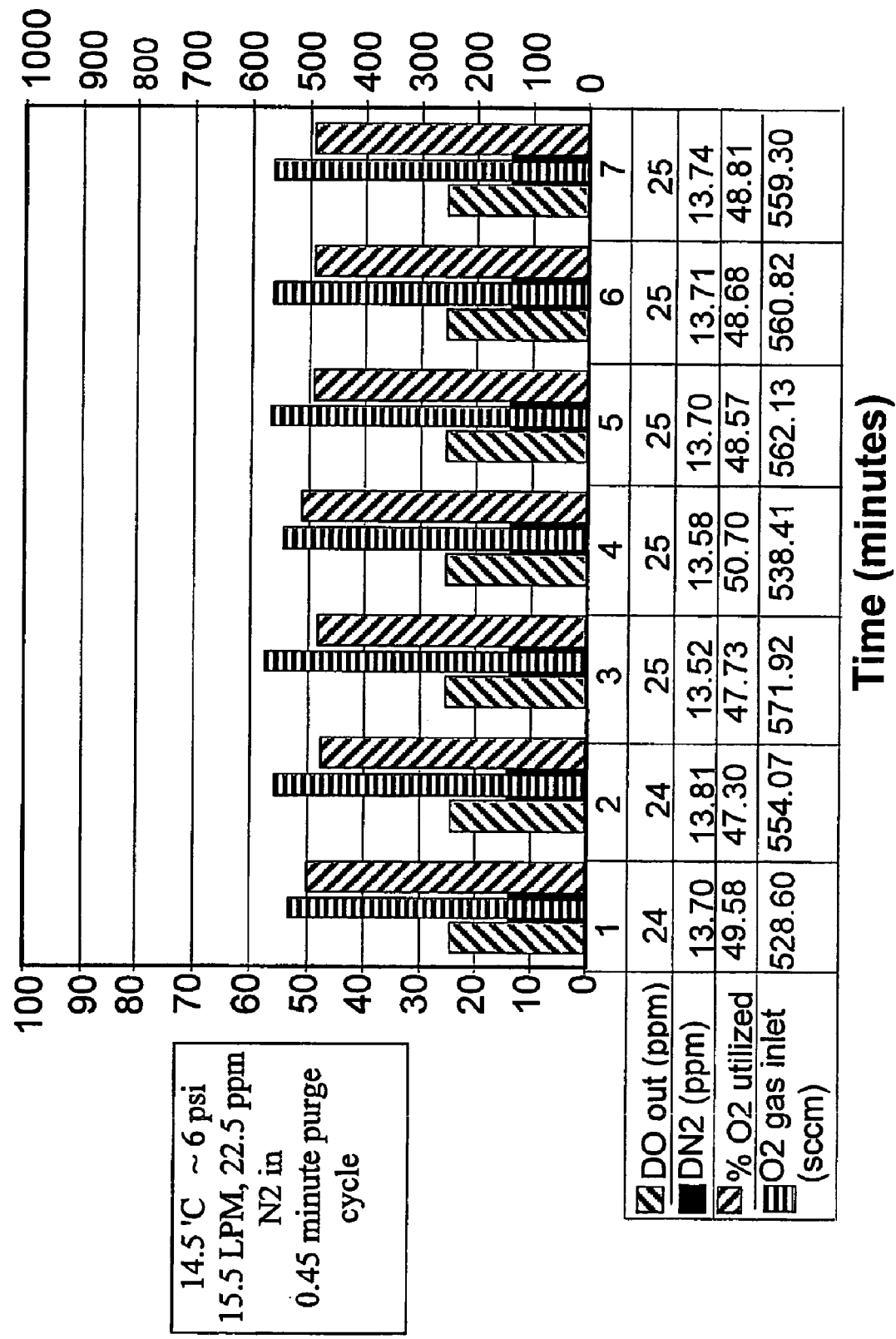
FIGS. 10 and 11 are graphs, which illustrate the performance of the FIG. 8 device.
Figure 11:
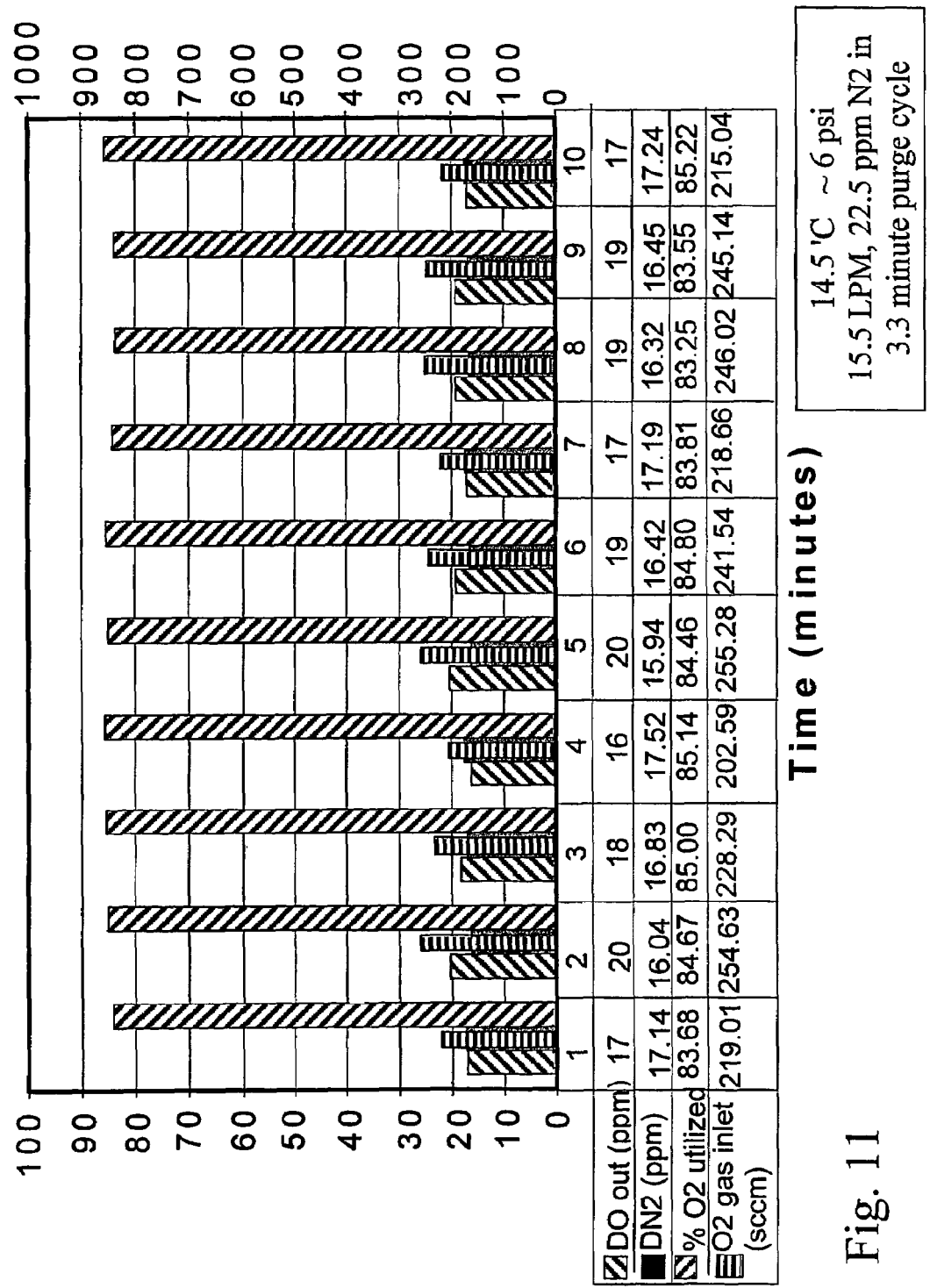
Figure 12:
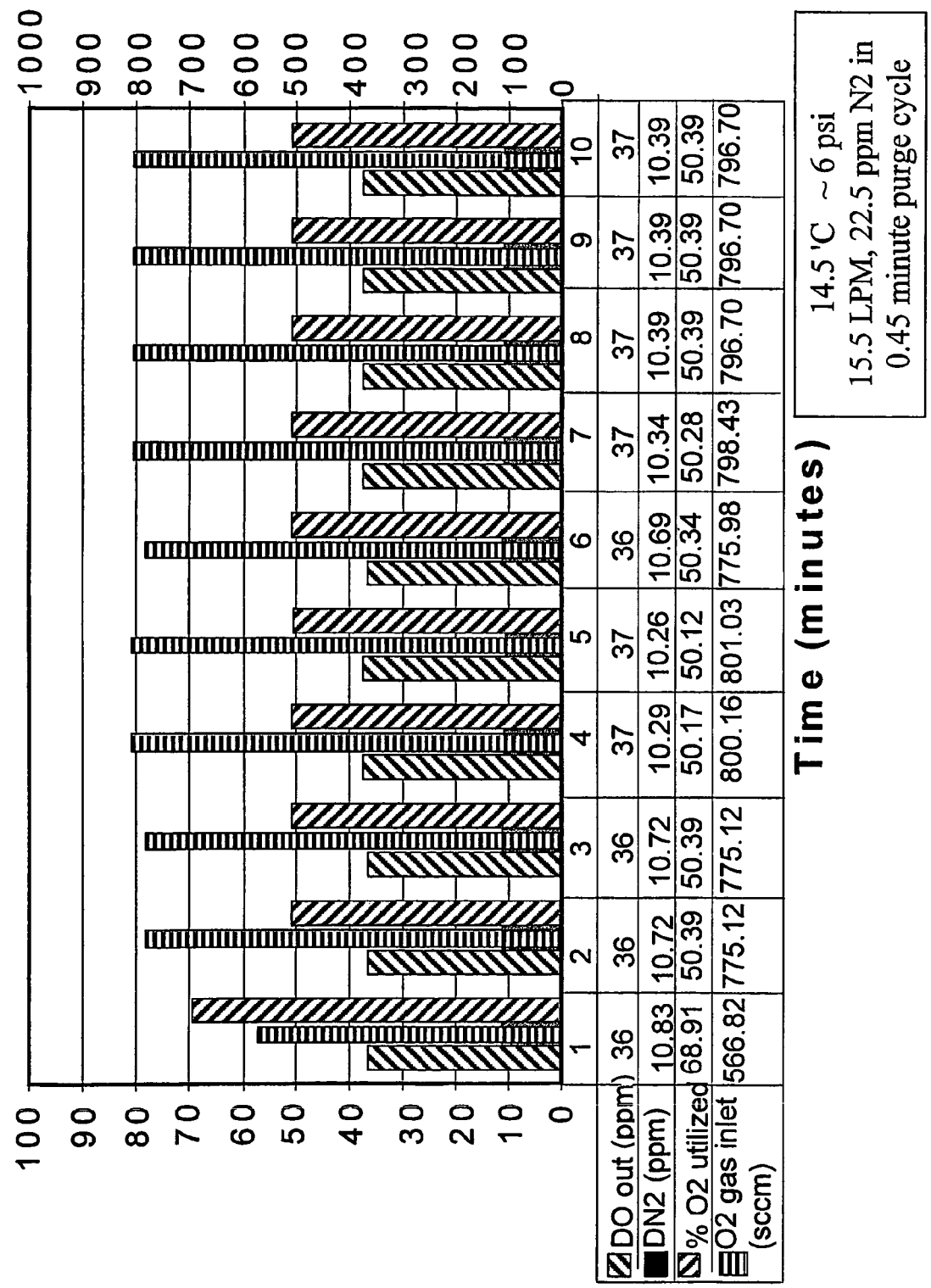
FIGS. 12-14 are graphs, which illustrate the performance of the FIG. 9 device.
Figure 13:
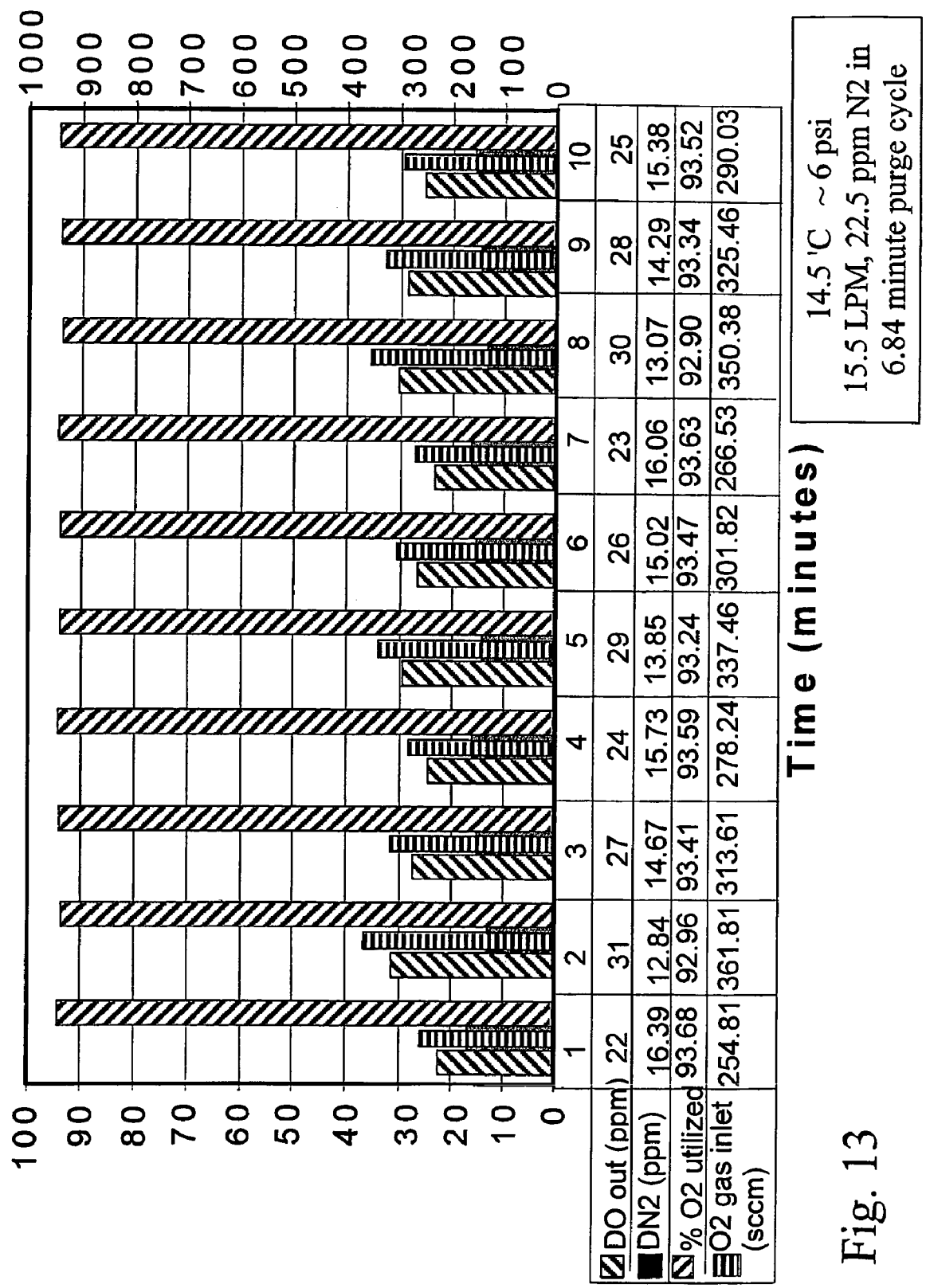
Figure 14:
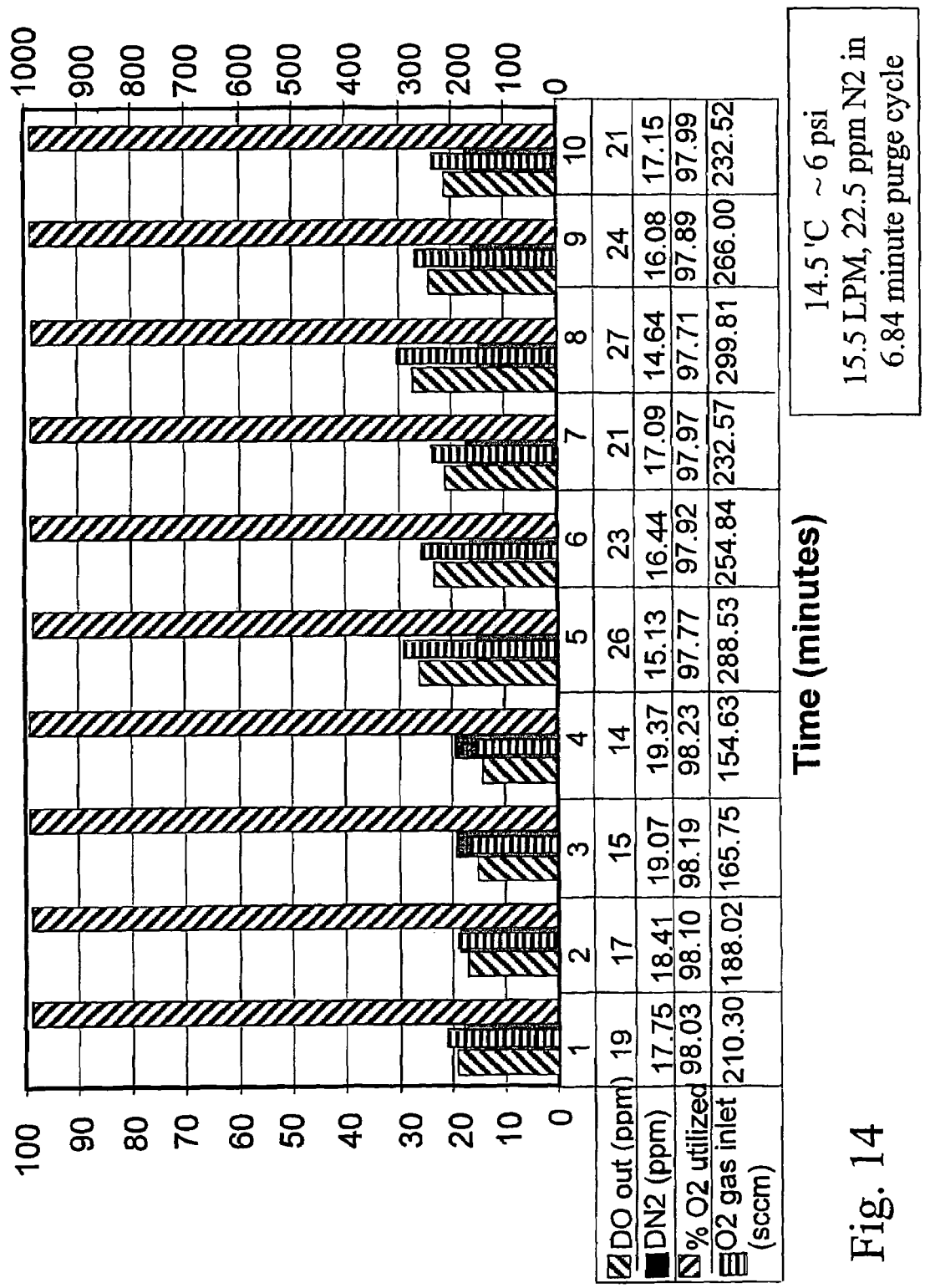

Each module consisted of 6400 microporous hydrophobic hollow fibres 20, potted in epoxy tubesheets 22 and inserted into a pressure case 24. Appropriate 'O-rings' 26 needed for sealing the gas from the liquid are shown. The fibres were obtained from Mitsubishi Rayon Corp. and were of the type 540T (polyethylene), having approximately 75% porosity. Other microporous hydrophobic fibre materials may also be used, such as those described in our prior U.S. application Ser. No. 09/307,423. The diameter of the fibre bundle (constructed around a perforated ¾"plastic pipe 28) was approximately 3 inches. The difference between the modules of FIGS. 8 and 9 is the liquid flow path. For the 'typical' gas infusion module (FIG. 8) the liquid (e.g. water) enters the central core and flows radially through the fibre bundle and exits through holes in the pressure case.

For our so-called 'PurGRO$_2$' module according to the invention and illustrated in FIG. 9, the water enters the central core 28a and encounters a solid plug 29. It exits the core and flows parallel to the fibres and then exits the module through the central core by way of perforations 31 on the opposite side of the 'plug'. The gas in both cases flows down the bore of fibres. In the 'original' gas infusion situation illustrated in FIG. 8, the liquid and the gas flow substantially 'crosscurrent' to each other. In the 'PurGRO$_2$' module, the liquid and the gas flow substantially 'countercurrent' to each other. Those skilled the art will recognize that there are many to accomplish countercurrent flow and the method described here is just one.

Each of the assembled modules was controlled in the following manner:

As illustrated schematically in FIG. 15, the water feed rate was controlled by means of a valve 50 downstream of the module 24. The water inlet pressure was controlled using a pressure regulator 52 upstream of the module 24. The gas (oxygen) was fed to the module from a high pressure cylinder (not shown). In order to maintain the oxygen at a pressure up to but not exceeding the water pressure, thereby preventing bubble formation as described in our prior U.S. application Ser. No. 09/307,423, both the oxygen inlet and the water lines were connected (through a 'T' connection in the water line and in series with the oxygen line) to a "differential pressure control valve" 54. This valve assured that (with the particular valve used) the pressure of the oxygen entering the module was always approximately ½ psi less than the pressure of the water leaving the module.

As described above, dissolved gas (for these tests nitrogen was used) is removed from the water, simultaneously as oxygen is being transferred to the water. The rate at which this gas is removed from the module will clearly influence overall gas transfer to and from the water. In order to demonstrate this, gas exiting the modules, was piped directly to a solenoid valve 56 before ultimate discharge to the atmosphere. This solenoid valve had a suitably small valve constant or Cv, such that when it was activated (for ~0.25 seconds), using a built-in timer, a very small amount of gas would be released and causing only a small fluctuation in the differential pressure between the oxygen inlet and the water outlet. (This fluctuation would only cause the differential pressure to increase, not decrease, thereby assuring that no gas bubbling would occur.) Increasing the frequency of the timer activation is equivalent to increasing the oxygen flow into the module. Whereas a higher oxygen flow would likely result in more nitrogen being removed from the water, it would also result in more oxygen purged (or wasted) to the atmosphere. (Those skilled in the art will recognize that other forms of oxygen flow rate control are possible.

The following results were either measured or calculated from the measurements:

Oxygen inlet flow rate, dissolved oxygen in the water leaving the module, dissolved nitrogen in the water leaving the module and the percentage of the oxygen fed that was actually utilized in increasing the oxygen content of the water. In each case, the water temperature was 14.5° C., the water flow rate was 15.5 LPM, the water inlet pressure was 6 psi, the water inlet contain 0 ppm of oxygen and 22.5 ppm of nitrogen.

The variable presented in the graphs of FIGS. 10 to 14 (other than the type of module) was the cycle time of the solenoid valve, which, as previously discussed is equivalent to the oxygen feed rate (G). Because of the cyclical nature of the variable, measurements were taken once per minute once the test had reached a 'steady state' condition.

From the FIGS. 10 to 14 graphs it is readily apparent that simultaneous transfer of dissolved gases to and from the water stream is not only possible using the apparatus/method but is also controllable.

Those skilled in the art will readily recognize that although our invention of the ability to produce a controlled altered 'atmosphere' has been illustrated using countercurrent gas/liquid flow, which provides a greater alteration of 'atmosphere', clearly, crosscurrent (and by logical extension co-current) operation can accomplish some lesser degree of 'atmosphere' alteration.

EXAMPLE 3

The following is another mode of operation which those skilled in the art will recognize has merit, in an aquaculture operation. These numbers are generated by a model which is based on that used in our previous U.S. application Ser. No. 09/307,423, as well as the results presented in FIGS. 12-14.

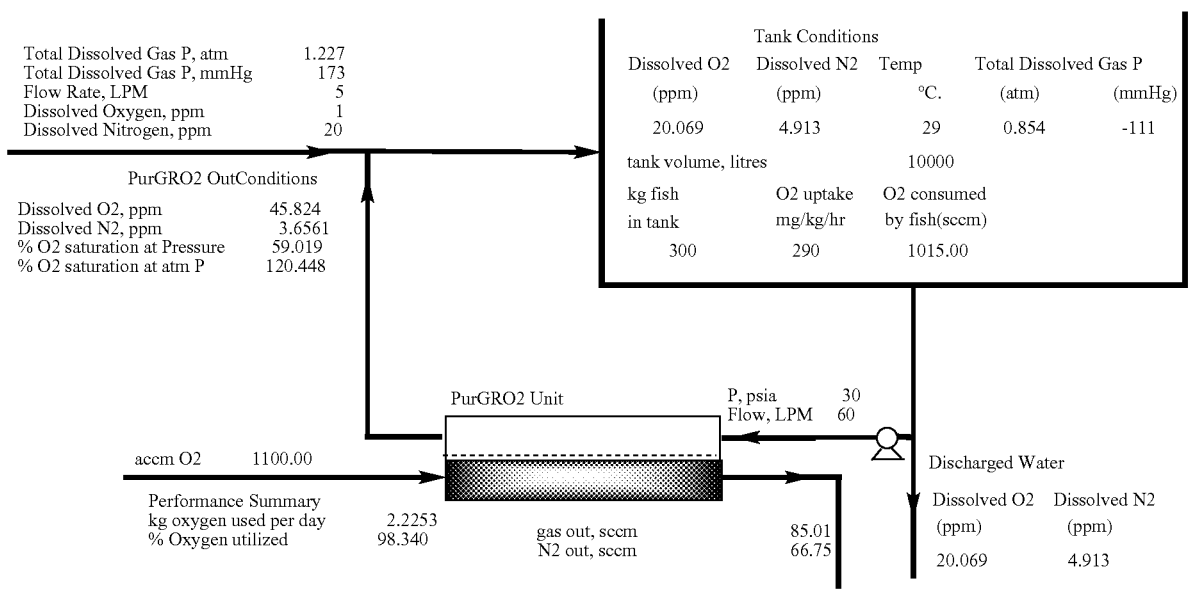

In the above illustrated scheme, a device such as that described in example 2 is fed water exiting a tank containing fish, using a pump. The water exiting the device is recombined with make-up water entering the operation and fed to the tank. Depending on the respiration rate of the fish (oxygen uptake rate) and the amount of fish present in the tank, as well as other variables shown in BOLD print, the 'atmospheric' conditions in the tank will reach a steady state. Proper choice of operating variables will allow the steady state 'atmospheric' condition of the tank to be beneficial to the health/growth rate, for example, of the fish.

It will be appreciated by those skilled in the art that the apparatus/method according to this invention is suitable for any gas/liquid combination, meeting the same criteria as described above and in our previous U.S. application Ser. No. 09/307,423, such as a liquid which is repellant to the fibre material, suitable chemical compatibility of gas/liquid and fibre material, as well as being suitable for the situation of liquid flow down the fibre bore and gas flow outside of the fibres or vice versa.

The invention claimed is:

1. An apparatus for controlling the dissolved gas content of an aqueous liquid containing dissolved gas, comprising a microporous hydrophobic hollow fibre membrane, to provide at equilibrium a stable interface between an aqueous liquid phase containing dissolved gas on a first side of the membrane and a gaseous phase on an opposite side of the membrane, means providing aqueous liquid phase and gaseous phase flow paths on opposite sides of the membrane, means for supplying an aqueous liquid phase containing dissolved gas to the first side of the membrane, means for controlling the flow feed rate of the aqueous liquid phase, means for controlling the aqueous liquid phase inlet pressure, means for supplying a gaseous phase to the other side of the membrane, means for removing gaseous phase from the apparatus, means for removing aqueous phase from the apparatus, and differential pressure control means for controlling the inlet pressure of the gaseous phase, whereby the gaseous phase pressure is up to but not exceeding the aqueous phase pressure, and in operation the simultaneous mass transfer through the membrane of a first gas in the gaseous phase into the liquid phase and of a second gas dissolved in the aqueous liquid into the gaseous phase occurs, so that the gas content of the first gas in the aqueous phase is increased, the gas content of the second gas in the gaseous phase is decreased and the total gas pressure of the aqueous phase is altered.

2. The apparatus of claim 1, wherein the means for supplying the liquid phase is connected to the outside of the membrane, and the means for supplying the gaseous phase is connected to the inside of the membrane, whereby the gaseous phase is on the inside of the hollow fibre membrane, and the aqueous phase is on the outside of the membrane.

* * * * *